US007701824B2

(12) United States Patent
Lee

(10) Patent No.: US 7,701,824 B2
(45) Date of Patent: Apr. 20, 2010

(54) METHOD OF DYNAMICALLY UPDATING MEDIA PLAY EFFECTS UTILIZED ON A DIGITAL PHOTO SLIDE SHOW

(75) Inventor: Hsieh-Te Lee, Taoyuan County (TW)

(73) Assignee: CyberLink Corp., Hsin-Tien, Tapei Hsien (TW)

( * ) Notice: Subject to any disclaimer, the term of this patent is extended or adjusted under 35 U.S.C. 154(b) by 593 days.

(21) Appl. No.: 11/747,221

(22) Filed: May 10, 2007

(65) Prior Publication Data
US 2008/0232212 A1 Sep. 25, 2008

(30) Foreign Application Priority Data
Mar. 19, 2007 (TW) .............................. 96109396 A

(51) Int. Cl.
*G11B 7/00* (2006.01)
(52) U.S. Cl. .................... 369/53.2; 369/30.03; 345/104
(58) Field of Classification Search ............... 369/53.2, 369/30.03, 30.04, 30.05; 345/104; 707/10; 348/222.1, 540, 450, 586; 396/311; 386/125, 386/126
See application file for complete search history.

(56) References Cited
U.S. PATENT DOCUMENTS 7,145,597 B1 * 12/2006 Kinjo ...................... 348/222.1
2005/0147398 A1 * 7/2005 Anderson et al. ........... 386/125

* cited by examiner

*Primary Examiner*—Ali Neyzari
(74) *Attorney, Agent, or Firm*—Winston Hsu

(57) ABSTRACT

Before playing a digital photo slide show, both required digital photos and a guiding program are burnt on an optical disc in advance. While the disc is loaded into an optical disc play device, the guiding program triggers the optical disc play device to connect with an external network for updating media play effect packages, which are related to the digital photos, and for storing the updated media play effect packages in a preserved database of said optical disc play device. Then a corresponding digital photo slide show is dynamically generated and played according to both the updated media play effect packages, which are stored in the preserved database, and the digital photos burnt on the optical disc.

16 Claims, 2 Drawing Sheets

METHOD OF DYNAMICALLY UPDATING MEDIA PLAY EFFECTS UTILIZED ON A DIGITAL PHOTO SLIDE SHOW

BACKGROUND OF THE INVENTION

1. Field of the Invention

The present invention relates to a method for updating a digital photo slide show, and more particularly, to a method of dynamically updating media play effect packages utilized on a digital photo slide show.

2. Description of the Prior Art

In a big party such as a wedding party, photos related to the party are collected for being burning on conventional digital versatile discs (DVD) and for sharing the collected photos with people who joined or did not join the party. Digital photos are popular means for recording such a party and for sharing the procedure of the party with people who joined or did not join the party. Conventionally, a plurality of digital photos taken at the party is collected after the party was over, and a digital photo slide show is generated from the collected plurality of digital photos and is burnt into digital versatile discs for sharing with people who joined or did not join the party. However, there are problems in such conventional means. For example, after sharing digital versatile discs burnt with an original digital photo slide show with people who joined or did not join the party, if there is an updated version of the digital photo slide show, such as increasing or decreasing, i.e. updating, media play effect packages utilized on the original digital photo slide show, an original plurality of digital photos for generating the original digital photo slide show has to be retrieved first, and the updated media play effect packages have to be applied on the retrieved original plurality of media play effect packages so that an updated digital photo slide show can be encoded and generated. The abovementioned circumstance is much unbeneficial for sharing and management of the plurality of digital photos after the original digital photo slide show is burnt into each shared digital versatile discs. Moreover, since data burnt into an optical disc are conventionally unable to be updated, it is also unbeneficial for a user, who retrieves updated media play effect packages from external websites, in management and sharing of digital photos having been burnt on an optical disc.

SUMMARY OF THE INVENTION

The claimed invention discloses a method of dynamically updating media play effects utilized on a digital photo slide show. The disclosed method comprises copying a plurality of digital photos and a guiding program into an optical disc, triggering a player program installed on a optical disc play device with the guiding program when the optical disc is loaded into the optical disc play device, updating media play effect packages related to the plurality of digital photos with a network and storing the updated media play effect packages into a preserved database of the optical disc play device, and loading the plurality of digital photos with the player program and dynamically generating a digital photo slide show according to the updated media play effect packages.

These and other objectives of the present invention will no doubt become obvious to those of ordinary skill in the art after reading the following detailed description of the preferred embodiment that is illustrated in the various figures and drawings.

DETAILED DESCRIPTION

Therefore, a method of dynamically updating media play effect packages utilized on a digital photo slide show is provided in the present invention for solving the abovementioned problems.

Figure 1:
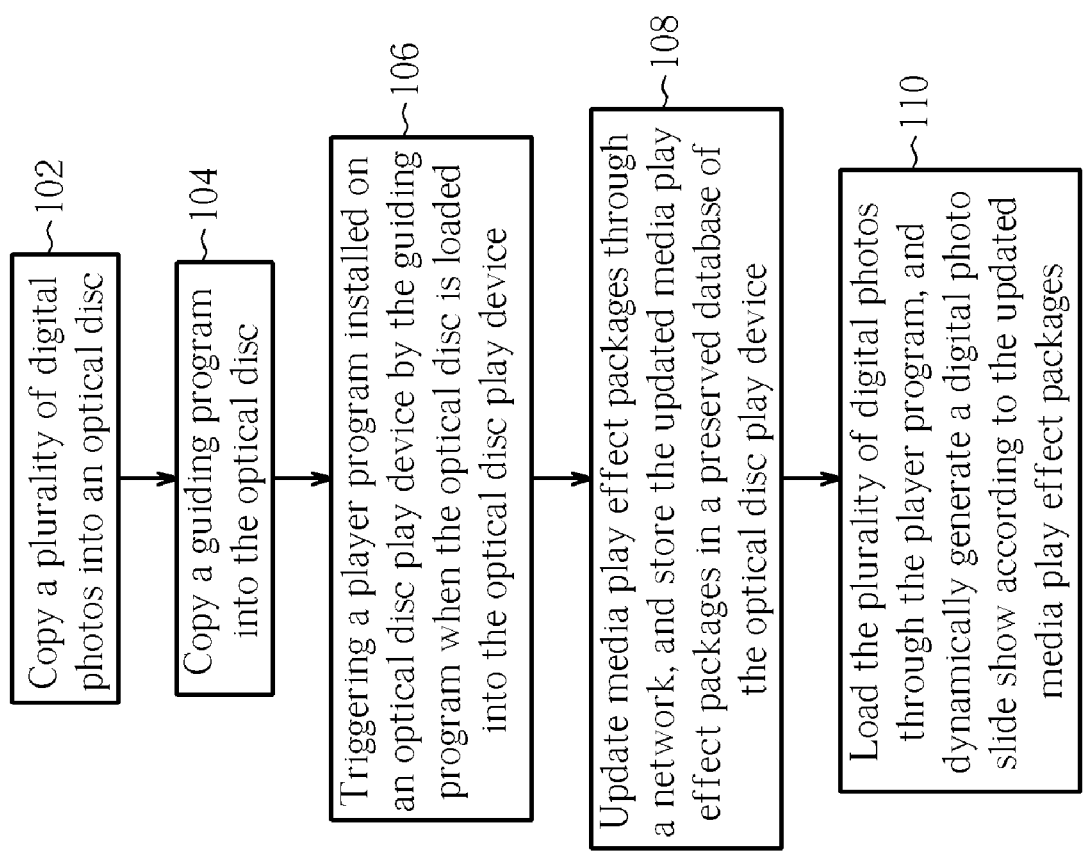
FIG. 1 is a flowchart of the method of dynamically updating media play effect packages utilized on a digital photo slide show in the present invention.

Please refer to FIG. 1, which is a flowchart of the method of dynamically updating media play effect packages utilized on a digital photo slide show in the present invention. The method illustrated in FIG. 1 includes steps as follows:

Step 102: Copying a plurality of digital photos into an optical disc.

Step 104: Copying a guiding program into the optical disc.

Step 106: Triggering a player program installed on an optical disc play device by the guiding program when the optical disc is loaded into the optical disc play device.

Step 108: Updating media play effect packages through a network, and storing the updated media play effect packages in a preserved database of the optical disc play device.

Step 110: Loading the plurality of digital photos through the play player program, and dynamically generating a digital photo slide show according to the updated media play effect packages.

Note that the optical disc mentioned in steps illustrated in FIG. 1 primarily indicates next generation optical discs such as the Blu-ray disc and the high definition digital versatile disc (HD DVD). However, the method of the present invention may also be applied on other types of optical discs, even on optical discs that have not been invented. Therefore, replacing the type of the applied optical disc in the method of the present invention should not be limitations to the method of the present invention.

In Step 102 and Step 104, merely an original plurality of digital photos and a guiding program are burnt into an optical disc. Moreover, optional media play effect packages may also be burnt into the optical disc in advance for preventing the problem resulted from the fact that additional storage of the optical disc is wasted by burning both the original plurality of digital photos and the digital photo slide show into the optical disc in the prior art.

In Step 108, the network for updating (and downloading) media play effect packages may be implemented with server websites or peer-to-peer (P2P) software. Besides, there is space preserved for updated media play effect packages in the optical disc play device. It indicates the fact that media play effect packages updated corresponding to digital photos burnt into the optical disc may be stored on a preserved database of the optical disc play device. Note that the preserved database may be implemented with high-speed cache or a hard drive. If there are media play effect packages originally burnt into the optical disc in advance, the updated media play effect packages are integrated with the original media play effect packages burnt into the optical disc. Moreover, the plurality of digital photos are loaded with the player program before a digital photo slide show is played so that the digital photo slide show is dynamically generated according to all the integrated media play effect packages.

Figure 2:
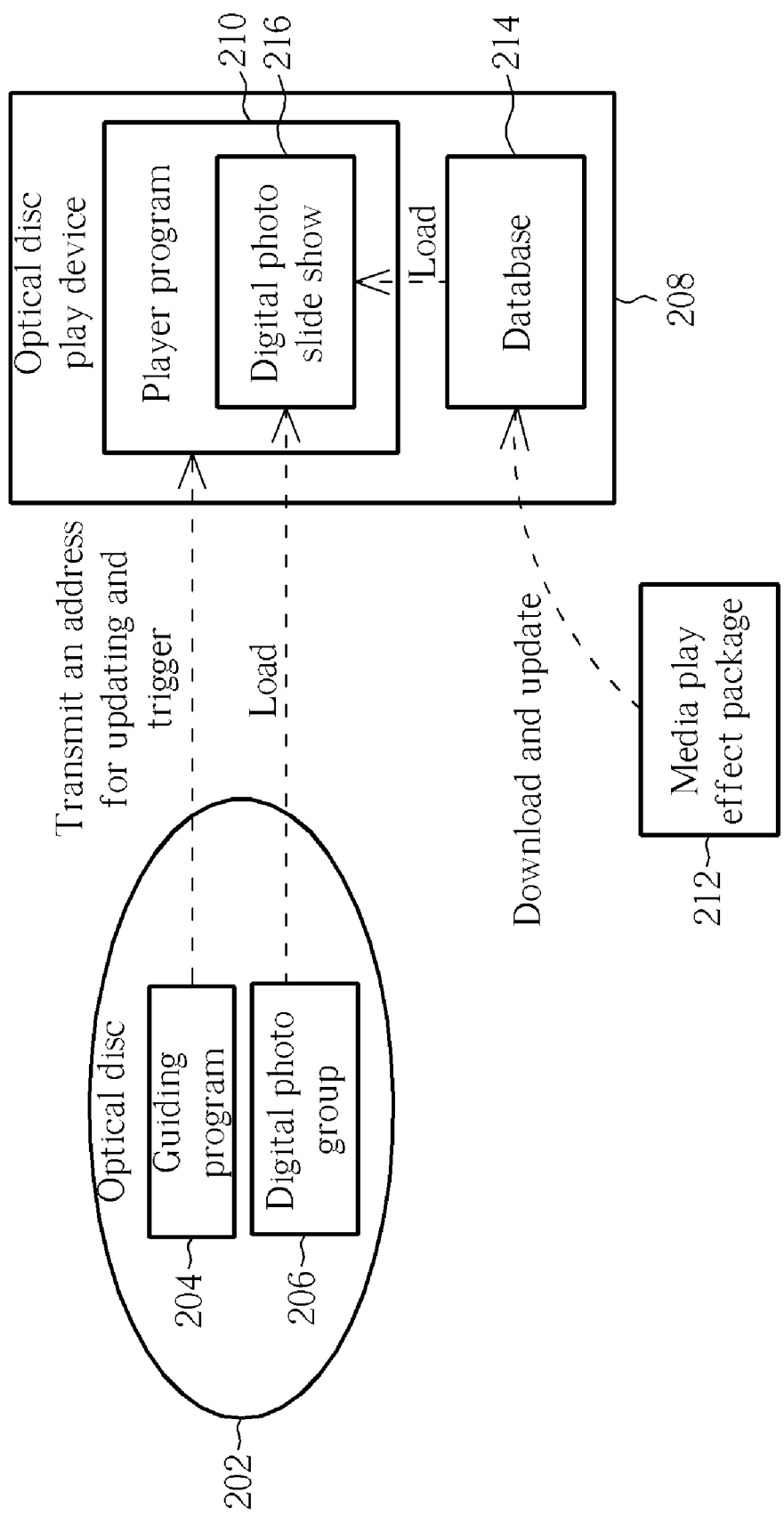
FIG. 2 is a simplified block diagram of generating the digital photo slide show after the optical disc is loaded into the optical disc play device from Step 106 to Step 110 described in FIG. 1.

Please refer to FIG. 2, and please refer to FIG. 1 together. FIG. 2 is a simplified block diagram of generating the digital photo slide show after the optical disc is loaded into the optical disc play device from Step 106 to Step 110 described in FIG. 1. As illustrated in FIG. 2, when an optical disc 202 is loaded into the optical disc play device 208, a guiding program 204 burnt on the optical disc 202 triggers a player program 210 installed on the optical disc play device 208, and an address for updating media play effect packages is transmitted to the player program 210. Besides both the guiding program 204 and a digital photo group 206, some media play effect packages, which are not illustrated on FIG. 2, may be burnt into the optical disc 202 in advance. Note that the optical disc play device 208 is assumed to acquire functions of exchanging messages or data with external sites, where the acquired functions include downloading updated media play effect packages from a specific website of an external network, and the updated media play effect packages include sound packages, background packages, and transition effect packages. In Step 108, the player program 210 connects with a specific website on an external network with the address transmitted from the optical disc 202 for downloading updated media play effect packages 212 on the specific website. The updated media play effect packages 212 are then stored in a preserved database 214 of the optical play device 208, where the database 214 may be implemented with high-speed cache or a hard drive. Note that the way that the player program 210 connects with the specific website may be implemented with peer-to-peer (P2P) software.

Note that in a preferred embodiment of the present invention, the player program 210 is driven by the Java virtual machine. The media play effect packages 212 may also be written based on Java Xlets, Java Script, or Markup language, i.e., the media play effect packages 212 may be generated by classifications of the application programming interface (API) of the Java language. In Step 110, a plurality of digital photos of the digital photo group 206 is loaded with the player program 210, and a digital photo slide show 216 is dynamically generated according to the updated media play effect packages 212 stored in the database 214. Note that the updated media play effect packages 212 are integrated with media play effect packages originally burnt on the optical disc 202. When the optical disc 202 is not previously burnt with media play effect packages, the updated media play effect packages 212 stored in the database 214 are directly utilized for generating the digital photo slide show 216.

A user may choose and load a plurality of digital photos from the digital photo group 206 with both a user interface equipped on the optical disc play device 208 and the player program 210. Moreover, the user may choose a required plurality of updated media play effect packages stored in the database 214 with the same user interface, and the digital photo slide show 216 may thus be generated and played. The abovementioned circumstance is well known by those who skilled in the art, and is not further described.

Note that the preserved database 214 does not store any media play effect packages until the updated media play effect packages 212 are downloaded and stored, i.e., the database 214 is merely preserved for temporary storage. Moreover, after the media play effect packages 212 are downloaded and stored in the database 214, and then the digital photo slide show 216 is generated, for example, after the optical disc 202 is ejected from the optical disc play device 208, the media play effect packages 212 stored in the database 214 are immediately deleted from the database 214 for releasing storage of the database 214 so that when another optical disc 202 is loaded into the optical disc play device 208, the released storage of the database 214 may be reused for storing other updated media play effect packages 212.

With the aid of the method illustrated in FIG. 1 and FIG. 2, i.e., the method of dynamically updating media play effect packages utilized on a digital photo slide show of the present invention, an updated digital photo slide show having updated media play effect packages downloaded from an external network may be directly generated with an optical disc play device, which is able to connect with the external network, so that original digital photos do not have to be retrieved again, and data burnt into the optical disc do not have to be updated either. Therefore, by arbitrarily downloading and storing updated media play effect packages, which are related to digital photos on the optical disc, in the preserved database of the optical disc play device, an updated digital photo slide show having updated media play effect packages can be dynamically generated, and it is no longer necessary to watch the updated digital photo slide show by retrieving another optical disc having updated media play effect packages. Moreover, since it is not necessary to burn media play effect packages into the optical disc, the storage of the optical disc for storing digital photos is increased, and the problem that storage of the optical disc is wasted by storing media play effect packages in the prior art is thus prevented.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of dynamically updating media play effects utilized on a digital photo slide show comprising:
   copying a plurality of digital photos and a guiding program into an optical disc;
   triggering a player program installed on an optical disc play device by the guiding program when the optical disc is loaded into the optical disc play device;
   updating media play effect packages related to the plurality of digital photos with a network, and storing the updated media play effect packages into a preserved database of the optical disc play device; and
   loading the plurality of digital photos with the player program, and dynamically generating a digital photo slide show according to the updated media play effect packages.

2. The method of claim 1 wherein the player program utilizes media play effect packages classified with the application programming interface (API) of the Java language.

3. The method of claim 1 wherein the media play effect packages are written according to Java Xlets.

4. The method of claim 1 wherein the media play effect packages are written according to Java Script.

5. The method of claim 1 wherein the media play effect packages are written according to Markup Language.

6. The method of claim 1 wherein the optical disc is a Blu-ray disc.

7. The method of claim 1 wherein the optical disc is a high definition digital versatile disc (HD DVD).

8. The method of claim 1 wherein updating media play effect packages related to the plurality of digital photos with the network and storing the updated media play effect packages into the preserved database of the optical disc play device comprises:

downloading the media play effect packages for updating from server websites.

9. The method of claim 1 wherein updating media play effect packages related to the plurality of digital photos with the network and storing the updated media play effect packages into the preserved database of the optical disc play device comprises:

downloading the media playing effect packages for updating with peer-to-peer (P2P) way.

10. The method of claim 1 wherein the preserved database is implemented with high-speed cache memory.

11. The method of claim 1 wherein the preserved database is implemented with hardware.

12. The method of claim 1 further comprising:

integrating the updated media play effect packages with media play effect packages originally burnt into the optical disc when the originally burn-in media effect packages exist on said optical disc, and loading the plurality of digital photos with the player program before playing a digital photo slide show for dynamically generating the digital photo slide show according to all the integrated media play effect packages.

13. The method of claim 1 wherein the media play effect packages comprise music packages.

14. The method of claim 1 wherein the media play effect packages comprise background packages.

15. The method of claim 1 wherein the media play effect packages comprise transition effect packages.

16. The method of claim 1 further comprising:

deleting the downloaded and updated media play effect packages from the preserved database after downloading the updated media play effect packages, and then the digital photo slide show is generated, and after the optical disc is ejected from the optical disc play device.

* * * * *

UNITED STATES PATENT AND TRADEMARK OFFICE
CERTIFICATE OF CORRECTION

PATENT NO. : 7,701,824 B2  Page 1 of 1
APPLICATION NO. : 11/747221
DATED : April 20, 2010
INVENTOR(S) : Hsieh-Te Lee It is certified that error appears in the above-identified patent and that said Letters Patent is hereby corrected as shown below:

On the title page, item (73), correct the residence of the Assignee from "Tapei Hsien" to --Taipei Hsien--.

Signed and Sealed this

Twenty-ninth Day of June, 2010

David J. Kappos
*Director of the United States Patent and Trademark Office*